United States Patent
Miller et al.

(10) Patent No.: US 9,880,827 B2
(45) Date of Patent: *Jan. 30, 2018

(54) MANAGING SOFTWARE VERSION UPGRADES IN A MULTIPLE COMPUTER SYSTEM ENVIRONMENT

(71) Applicant: International Business Machines Corporation, Armonk, NY (US)

(72) Inventors: Robert Miller, Rochester, MN (US); Kiswanto Thayib, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/840,030

(22) Filed: Aug. 30, 2015

(65) Prior Publication Data

US 2017/0060561 A1    Mar. 2, 2017

(51) Int. Cl.
*G06F 9/44* (2006.01)
*G06F 9/445* (2006.01)

(52) U.S. Cl.
CPC .............. *G06F 8/65* (2013.01); *G06F 8/68* (2013.01); *G06F 8/71* (2013.01)

(58) Field of Classification Search
CPC ............................................. G06F 8/61–8/67
See application file for complete search history.

(56) References Cited

U.S. PATENT DOCUMENTS

| 6,163,855 | A | 12/2000 | Shrivastava et al. |
| 7,130,897 | B2 | 10/2006 | Dervin et al. |
| 7,260,818 | B1 * | 8/2007 | Iterum .................. G06F 8/71 717/102 |
| 8,140,644 | B2 | 3/2012 | Hagale et al. |
| 8,151,021 | B1 | 4/2012 | Glade et al. |
| 2003/0074425 | A1 * | 4/2003 | Kawakita ........ G06F 17/30873 709/219 |

(Continued)

OTHER PUBLICATIONS

Anonymous, "npm install should recursively check/install dependencies", on-line discussion published at https://www.bountysource.com/issues/238151-npm-install-should-recursi . . . , publication date unknown, printed Jan. 9, 2015.

(Continued)

*Primary Examiner* — Lewis A Bullock, Jr.
*Assistant Examiner* — Tina Huynh
(74) *Attorney, Agent, or Firm* — Roy W. Truelson

(57) ABSTRACT

An independent product upgrade function is associated with each of multiple software products installed in a set of multiple computing devices. Responsive to a triggering event, each upgrade function determines whether the corresponding product can be updated based on rules for the corresponding product. Upgrade may be dependent on other products, but the upgrade function need not know the conditions for upgrading other products. If a product can be updated, update is performed and all other products are notified. Each of the other product upgrade functions then determines whether its corresponding product can be upgraded as a result of the recent upgrade to the first product, and if so, another set of notifications is sent. This cycle continues until all dependent products have been updated. Upgrade functions preferably operate in a peer-to-peer relationship, and upgrade can be initiated in any node.

12 Claims, 9 Drawing Sheets

(56) References Cited

U.S. PATENT DOCUMENTS

| | | | |
|---|---|---|---|
| 2004/0040875 A1 | 3/2004 | Gallagher | |
| 2005/0066019 A1* | 3/2005 | Egan | G06F 8/65 709/223 |
| 2006/0190581 A1* | 8/2006 | Hagale | G06F 9/5061 709/223 |
| 2012/0254391 A1 | 10/2012 | Ganapathy et al. | |
| 2013/0014097 A1 | 1/2013 | Draper et al. | |
| 2013/0227542 A1* | 8/2013 | Pei | G06F 8/71 717/170 |
| 2014/0040875 A1* | 2/2014 | Bower, III | G06F 8/65 717/170 |
| 2014/0096110 A1* | 4/2014 | Charters | G06F 8/70 717/120 |
| 2014/0123123 A1* | 5/2014 | Bahls | G06F 8/71 717/170 |

OTHER PUBLICATIONS

Microsoft Corp., "Cluster Aware Updating: Frequently Asked Questions", published on-line at http://technet.microsoft.com/en-us/library/hh831367.aspx, published Oct. 17, 2013.

G. Foster, "How to Update Oracle Solaris 11 Systems From Oracle Support Repositories", published on-line at http://www.oracle.com/technetwork/articles/servers-storage-admin/o11-0 . . . , Mar. 2012.

* cited by examiner

MANAGING SOFTWARE VERSION UPGRADES IN A MULTIPLE COMPUTER SYSTEM ENVIRONMENT

FIELD OF THE INVENTION

The present invention relates to digital data processing, and in particular to the management of multiple computer systems and upgrades to software installed on multiple computer systems of a cluster or other multi-system environment.

BACKGROUND

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users. At the same time, the cost of computing resources has consistently declined, so that information which was too expensive to gather, store and process a few years ago, is now economically feasible to manipulate via computer. The reduced cost of information processing drives increasing productivity in a snowballing effect, because product designs, manufacturing processes, resource scheduling, administrative chores, and many other tasks, are made more efficient.

Early computer systems were isolated machines, in which data was input manually or from storage media and output generated to storage media or human perceptible form. While useful in their day, these systems were extremely limited in their ability to access and share information. As computers became more capable, and the ability to store vast amounts of digital data became prevalent, the desirability of communicating with other computer systems and sharing information became manifest. This demand for sharing information led to a growth of computer networks, including the Internet. It is now rare to find a general purpose computer system having no access to a network for communicating with other computer systems, although many special-purpose digital devices still operate in isolated environments.

This evolution of isolated computers to networked devices and shared information has proceeded to cloud computing and clustering. A "cloud" and a "cluster" are related, not necessarily mutually exclusive, vehicles for networked computing. A "cloud" is a collection of computing hardware and software resources which are accessible on demand from a remote location to perform useful work on behalf of a client. The client contracts to obtain virtualized computing serves from a cloud provider, without any specification of the particular physical computer systems which will provide the contracted service. This virtualization enables a cloud provider to re-allocate the physical computer resources as convenient, without involvement of the client. Cloud computing has thus been analogized to an electric utility, in which the customer purchases electric power without any knowledge or concern how the power is generated.

A "cluster" generally refers to a computer system organization in which multiple computers, also called "nodes", are networked together to cooperatively perform computing tasks. An important aspect of a computer cluster is that all of the nodes in the cluster present a single system image— that is, from the perspective of a user, the nodes in a cluster appear collectively as single computer, or entity.

Clustering is often used in relatively large multi-user computer systems where high performance and/or reliability are of concern. For example, clustering may be used to provide redundancy, or fault tolerance, so that, should any node in a cluster fail, the operations previously performed by that node will be handled by other nodes in the cluster. Clustering is also used to increase overall performance, since multiple nodes can often handle a larger number of tasks in parallel than a single computer otherwise could. Often, load balancing can also be used to ensure that tasks are distributed fairly among nodes to prevent individual nodes from becoming overloaded and therefore maximize overall system performance. One specific application of clustering, for example, is in providing multi-user access to a shared resource such as a database or a storage device, since multiple nodes can handle a comparatively large number of user access requests, and since the shared resource is typically still available to users even upon the failure of any given node in the cluster.

Clusters typically handle computing tasks through the performance of "jobs" or "processes" within individual nodes. In some instances, jobs being performed by different nodes cooperate with one another to handle a computing task. Such cooperative jobs are typically capable of communicating with one another, and are typically managed in a cluster using a logical entity known as a "group." A group is typically assigned some form of identifier, and each job in the group is tagged with that identifier to indicate its membership in the group.

Member jobs in a group typically communicate with one another using an ordered message-based scheme, where the specific ordering of messages sent between group members is maintained so that every member sees messages sent by other members in the same order as every other member, thus ensuring synchronization between nodes. Request for operations to be performed by the members of a group are often referred to as "protocols", and it is typically through the use of one or more protocols that tasks are cooperatively performed by the members of a group. One type of protocol, for example, is a membership change protocol, which is used to update the membership of a particular group of member jobs, e.g., when a member job needs to be added to or removed from the group.

Clustered computer systems also typically rely on some form of cluster infrastructure software that is resident on each node in the cluster, and that provides various support services that group members utilize in connection with performing tasks. Cluster infrastructure may be integrated with an operating system or a separate software product or module executing above low-level operating system kernel functions such as dispatching and address translation, but it typically executes at a level below the applications it supports and manages the execution of group members and provides a programming interface through which jobs can invoke various cluster-related support functions (e.g., to pass messages between group members, to change group membership, etc.)

Cluster infrastructure software, as well as other software executing in a cluster, may be upgraded from time to time, each release of new software being associated with a "version" that distinguishes it from prior releases of the same software. Upgrades may be released to correct errors, security exposures, and the like in the software, or to add new functions and capabilities. Upgrading software in a cluster generally requires that the upgraded software version be installed on each individual system or "node" of the cluster.

For various reasons of consistency, a cluster may be architecturally constrained to execute a single respective common version of each software application or cluster infrastructure software installed on the multiple systems of the cluster, or to disable newly added functions and capabilities until the function or capability is available on a sufficient number of systems of the cluster. It is desirable to manage upgrades so that, when a software upgrade becomes available, all systems of the cluster are upgraded to a common version. However, upgrade is often a disruptive process, in which the functions provided by the software are temporarily unavailable to users. If all systems of a cluster are simultaneously halted, suspended or otherwise interrupted while new software is loaded, the cluster's functions will be unavailable for some period of time. This is often unacceptable to a business operating or using a cluster which is intended to be continuously available.

It is possible to centrally manage the software upgrade process by upgrading systems one at a time or not all simultaneously, in such a manner that, at any given time, one or more systems are available to provide essential functions, and to switch operation to the upgraded software version when it has been loaded on a sufficient number of systems to provide essential function (this number being referred to as a "quorum"). However, due to interleaved dependencies among multiple software products, this process can be very complex, requiring significant complexity in any central upgrade manager. The upgrade manager will typically itself need to be upgraded from time to time to take into account all software dependencies. Furthermore, as a result of multiple dependencies, it may have the collateral effect of delaying upgrade or causing unneeded software to be loaded and/or upgraded in some systems merely to support upgrade of another software product.

Conventional multi-system management tools are overly complex and/or do not always optimally manage upgrade processes in a clustered or other complex multi-server environment. With the growth in clustering and other forms of shared and distributed use of computing resources, a need exists for improved techniques for managing software upgrades among multiple systems, and in particular, for managing upgrading of multiple computer systems of a continuous availability cluster consistent with all software dependencies.

SUMMARY

In one or more aspects, an independent product upgrade function is associated with each of multiple software products installed in a set of multiple computing devices. Each product upgrade function updates its own product versions automatically based on its own update rules.

In one or more embodiments, responsive to a triggering event, each product upgrade function determines whether the corresponding product can be updated based on rules applicable to the corresponding product, without reference to rules governing the update of other products. Upgrade may be dependent on one or more other product versions, but the product upgrade function need not know the conditions for upgrading other products. If a product can be updated, update is performed and a cluster protocol message is sent to all other products notifying them of the upgrade. Each of the other product upgrade functions then determines whether its corresponding product can be upgraded as a result of the recent upgrade to the first product, and if so, another set of cluster protocol messages is sent. This cycle continues until all dependent products have been updated.

In one or more embodiments, product upgrade functions in the multiple computing devices operate in a peer-to-peer relationship, passing messages to one another to notify other product upgrade functions of status and to trigger upgrade actions in other product upgrade functions. An upgrade process can be initiated in any computing device responsive to appropriate triggering events.

Preferably, the multiple computer systems act as a "cluster" to perform work on behalf of requesting clients. The cluster is constrained to provide a single, common version of each software product it executes. However, a software product need not be installed on all nodes of the cluster. Since each product is updated independently, a product may be installed only on a subset of nodes, or even on only a single node.

By independently determining upgrade eligibility for each product supported by a cluster, the upgrade process is simplified and/or constraints which might be present in a centralized version manager are avoided, thereby reducing costs and/or increasing efficiency in a computing cluster.

The details of the present invention, both as to its structure and operation, can best be understood in reference to the accompanying drawings, in which like reference numerals refer to like parts, and in which:

DETAILED DESCRIPTION

Cluster Overview

Figure 1:
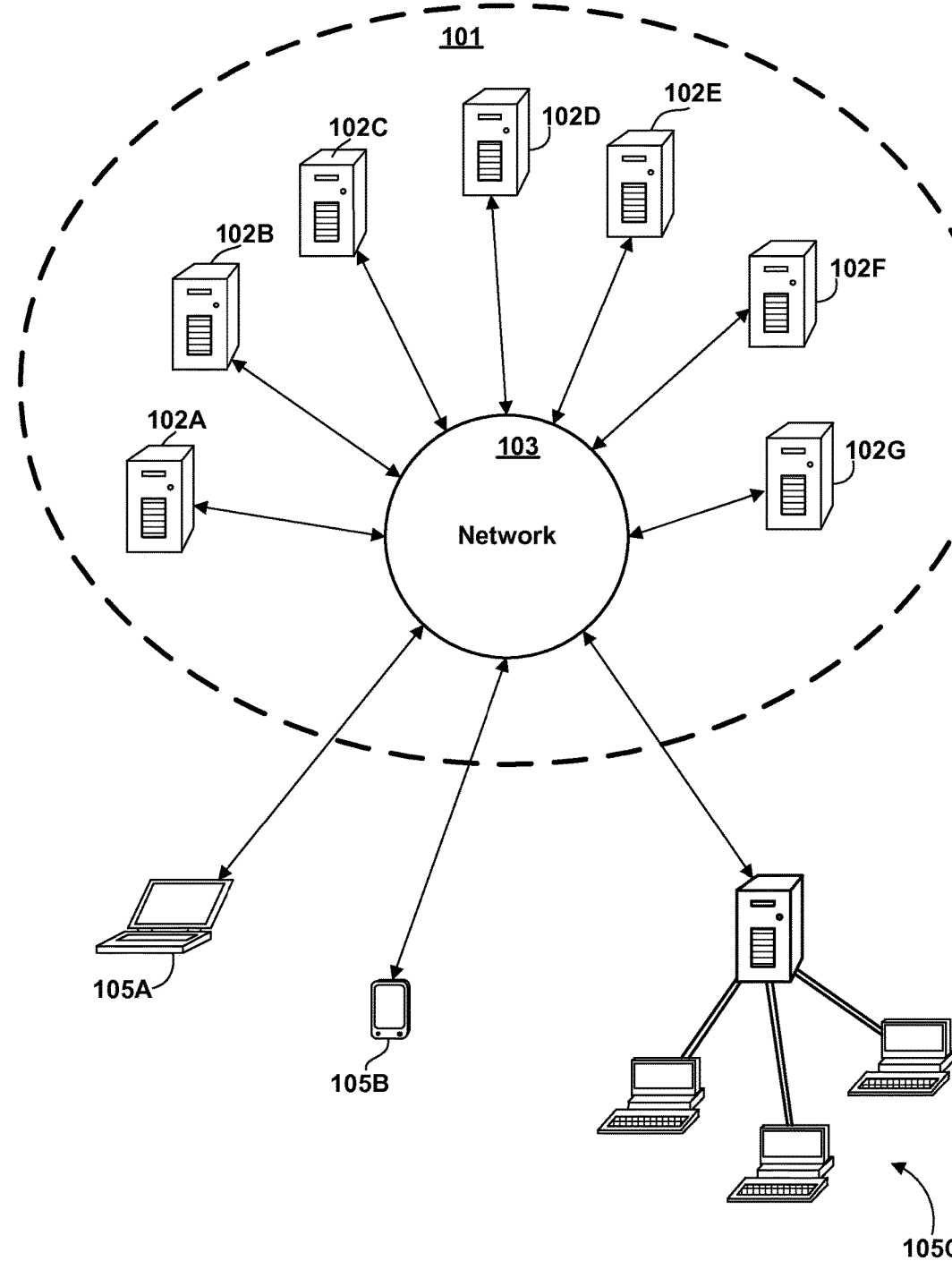
FIG. 1 is a high-level illustration of the representative major physical components which implement a computer system cluster, in accordance with one or more preferred and/or alternative embodiments of the present invention.

Referring to the Drawing, wherein like numbers denote like parts throughout the several views, FIG. 1 is a high-level illustration of the representative major physical components which implement a computer system cluster 101, in accordance with one or more preferred and/or alternative embodiments of the present invention. As shown in FIG. 1, the cluster 101 is implemented as a collection of physical computing devices referred to as nodes 102A-G (herein generically referred to as feature 102) coupled to at least one network 103 (which may in fact be embodied as a collection of networks capable of communicating data among themselves). Nodes 102 are preferably general purpose digital computer systems, each having a respective at least one programmable central processing unit (CPU) which executes instructions storable in an addressable memory, although they could be any digital data computing device having upgradeable software executing therein. The cluster 101 may further include additional devices (not shown), such as storage servers, routers, special purpose digital devices for performing accounting, maintenance, backup, and other functions, and/or other devices.

Multiple client devices 105A-C (herein generically referred to as feature 105) access respective computing services in cluster 101. A client could be any digital data device capable of communicating with the cluster over a network. For example, FIG. 1 represents a laptop computer system 105A, a handheld portable device 105B such as a personal digital assistant, smartphone, or the like, and a multi-user computer system 105C having multiple terminals attached thereto. However, it will be understood that these examples are not exhaustive, and any of various alternative digital data devices could be used, that such devices might be single user or multiple user, might be general-purpose programmable digital computers or special purpose digital devices, could have fixed location or movable location (including vehicular mounted devices), and so forth.

From the perspective of the client, each client device 105A, 105B, 105C obtains computing services from the cluster 101 as a single entity. I.e, the cluster appears to the client as a single computer system having certain hardware and software resources which performs computing services on behalf of the client. The client requests a computing service from the cluster without knowing the particular configuration of nodes 102 within cluster 101, and without requesting that any particular node within the cluster perform the service. The cluster determines which node or nodes will perform a particular request, and performs the request accordingly.

In one or more embodiments, network 103 is or includes the Internet, and may further include other networks, such as one or more local area networks, which are coupled to the Internet and capable of communicating therewith, as is well known in the art. Additionally, in an embodiment, may include one or more virtual networks (VLANs). In particular, a client 105 may access computing resources in the networked environment via the Internet, although the various nodes 102 in the cluster may be configured as one or more local area networks or VLANs in communication with the Internet. However, a networked computing environment would not necessarily have to include the Internet, and might include some other network or networks, such as an internal network of a large business entity.

Although FIG. 1 represents in simplified form a particular number of nodes 102 and clients 105, it will be appreciated that the number of such devices could vary and is typically much larger. It will further be understood that, although various devices may appear identical for representational purposes in the figures, they do not necessarily have identical attributes. It will be further understood that the topology of network 103 is represented in simplified form in FIG. 1 for clarity of illustration, and that the actual topology of network communications may be far more complex, and may involve redundant networks and links, hierarchical network connections and/or any of various network configurations known in the art.

Computer System Hardware Components

Figure 2:
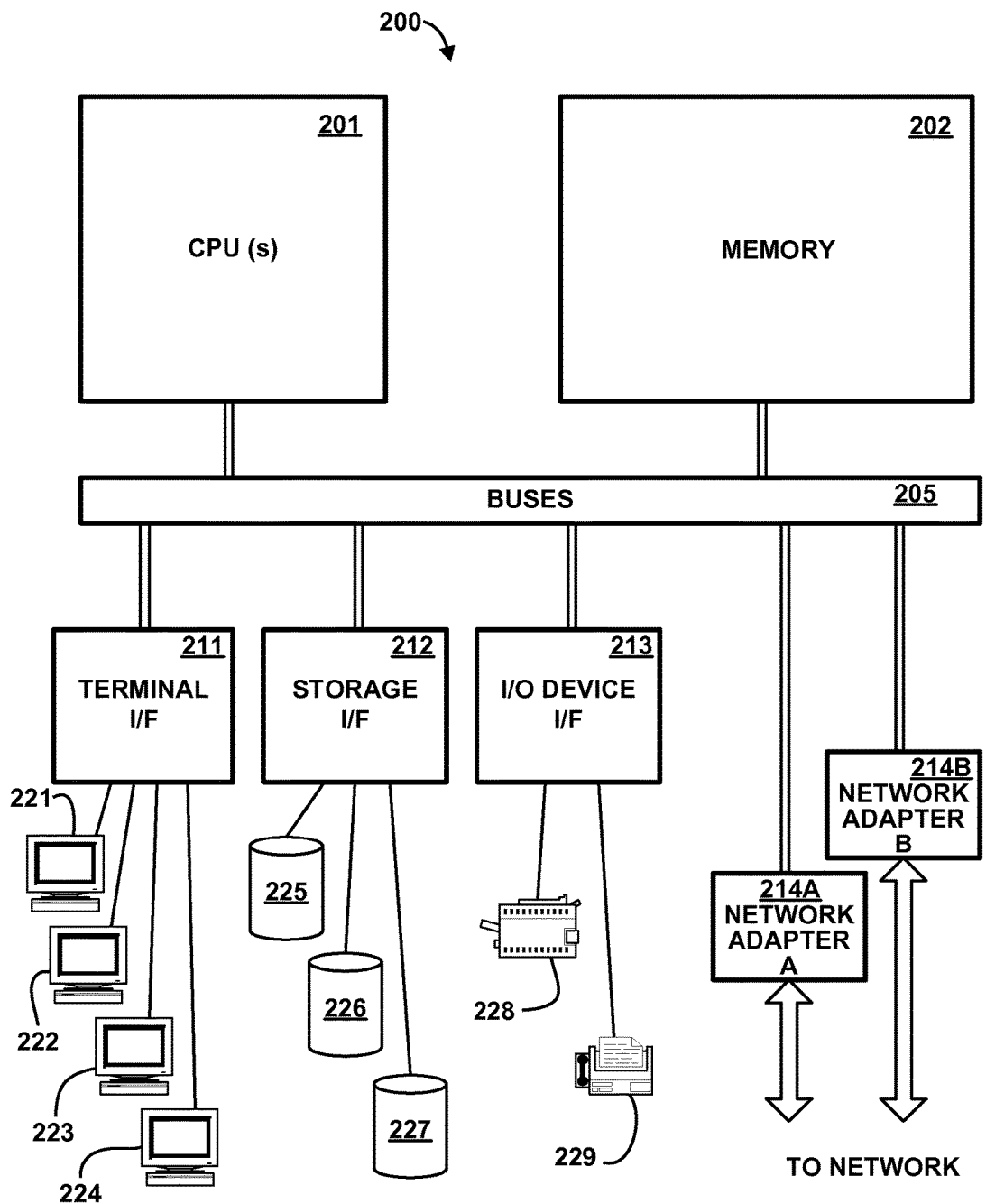
FIG. 2 is a high-level block diagram of the major hardware components of a representative general purpose computer system which could be used to perform the role of any of several functional elements, according to one or more preferred and/or alternative embodiments

FIG. 2 is a high-level block diagram of the major hardware components of a representative general purpose computer system 200. In one or more embodiments, node systems 102 are physically embodied as respective one or more general purpose computer systems, system 200 being a representation of any such general purpose computer system. Client 105 may also be embodied as a general purpose computer system.

Computer system 200 includes at least one general-purpose programmable processor (CPU) 201 which executes instructions and processes data from main memory 202. Main memory 202 is preferably a random access memory using any of various memory technologies, in which data is loaded from storage or otherwise for processing by CPU 201.

One or more communications buses 205 provide a data communication path for transferring data among CPU 201, main memory 202 and various I/O interface units 211, 212, 213, 214A, 214B, which may also be known as I/O processors (IOPs) or I/O adapters (IOAs). The I/O interface units support communication with a variety of storage and I/O devices. For example, terminal interface unit 211 supports the attachment of one or more user terminals 221-224. Storage interface unit 212 supports the attachment of one or more direct access storage devices (DASD) 225-227 (which are typically rotating magnetic disk drive storage devices, although they could alternatively be other devices, including arrays of disk drives configured to appear as a single large storage device to a host). I/O device interface unit 213 supports the attachment of any of various other types of I/O devices, such as printer 228 and fax machine 229, it being understood that other or additional types of I/O devices could be used. Network interface adapters 214A, 214B (herein generically referred to as feature 214) support connections to one or more external networks for communication with one or more other digital devices, and specifically to network 103 for communication with devices represented in FIG. 1. Network adapters 214 could support redundant connections to a single network, or could be coupled to separate networks, which may or may not be in communication with each other. While two network adapters 214 and network connections are shown, there may be only a single adapter and connection, or there could be more than two. Such external networks preferably include the Internet, and may include one or more intermediate networks, such as local area networks (not shown), through which communication with the Internet is effected.

It should be understood that FIG. 2 is intended to depict the representative major components of general purpose computer system 200 at a high level, that individual components may have greater complexity than represented in FIG. 2, that components other than or in addition to those shown in FIG. 2 may be present, that the number, type and configuration of such components may vary, and that a complex computer system will typically have more components than represented in FIG. 2. Several particular examples of such additional complexity or additional variations are disclosed herein, it being understood that these are by way of example only and are not necessarily the only such variations.

Although only a single CPU 201 is shown for illustrative purposes in FIG. 2, computer system 200 may contain multiple CPUs, as is known in the art. Although main memory 202 is shown in FIG. 2 as a single monolithic entity, memory 202 may in fact be distributed and/or hierarchical, as is known in the art. For example, memory may exist in multiple levels of caches, and these caches may be further divided by function, so that one cache holds instructions while another holds non-instruction data which is used by the processor or processors. Memory may further be distributed and associated with different CPUs or sets of CPUs, as is known in any of various so-called non-uniform memory access (NUMA) computer architectures Although communications buses 205 are shown in FIG. 2 as a single entity, in fact communications among various system components is typically accomplished through a complex hierarchy of buses, interfaces, and so forth, in which higher-speed paths are used for communications between CPU 201 and memory 202, and lower speed paths are used for communications with I/O interface units 211-214. Buses 205 may be arranged in any of various forms, such as point-to-point links in hierarchical, star or web configurations, multiple hierarchical buses, parallel and redundant paths, etc. For example, as is known in a NUMA architecture, communications paths are arranged on a nodal basis. Buses may use, e.g., an industry standard PCI bus, or any other appropriate bus technology. While multiple I/O interface units are shown which separate buses 205 from various communications paths running to the various I/O devices, it would alternatively be possible to connect some or all of the I/O devices directly to one or more system buses.

Computer system 200 depicted in FIG. 2 has multiple attached terminals 221-224, such as might be typical of a multi-user "mainframe" computer system. Typically, in such a case the actual number of attached devices is greater than those shown in FIG. 2, although the present invention is not limited to systems of any particular size. Where computer system 200 is used exclusively as an administrative management console 104 or a node system 102 for performing work on behalf of remote clients 105, it may contain only a limited number of terminals, or even a single terminal, e.g., for use as a maintenance interface by a system administrator or the like, or in some cases no terminal at all, administrative functions being performed remotely. Furthermore, while certain functions are described herein for illustrative purposes as embodied in a single computer system, some or all of these functions could alternatively be implemented using a distributed network of computer systems in communication with one another, in which different functions or steps described herein are performed on different computer systems.

In accordance with one or more embodiments, node systems 102, and at least some clients 105, are general purpose computer systems capable of being programmed to execute a variety of different functions by loading and executing appropriate software. The functions described herein are performed by appropriate executable software modules installed in the corresponding computer systems. However, any of these devices could alternatively be special-purpose digital data devices for accomplishing the corresponding functions. For example, one or more of client devices may be any of various smart phones or portable devices capable of invoking remote computing functions through an on-board browser or limited browser function.

While various system components have been described and shown at a high level, it should be understood that a typical computer system contains many other components not shown, which are not essential to an understanding of the present invention.

Cluster Software

Figure 3:
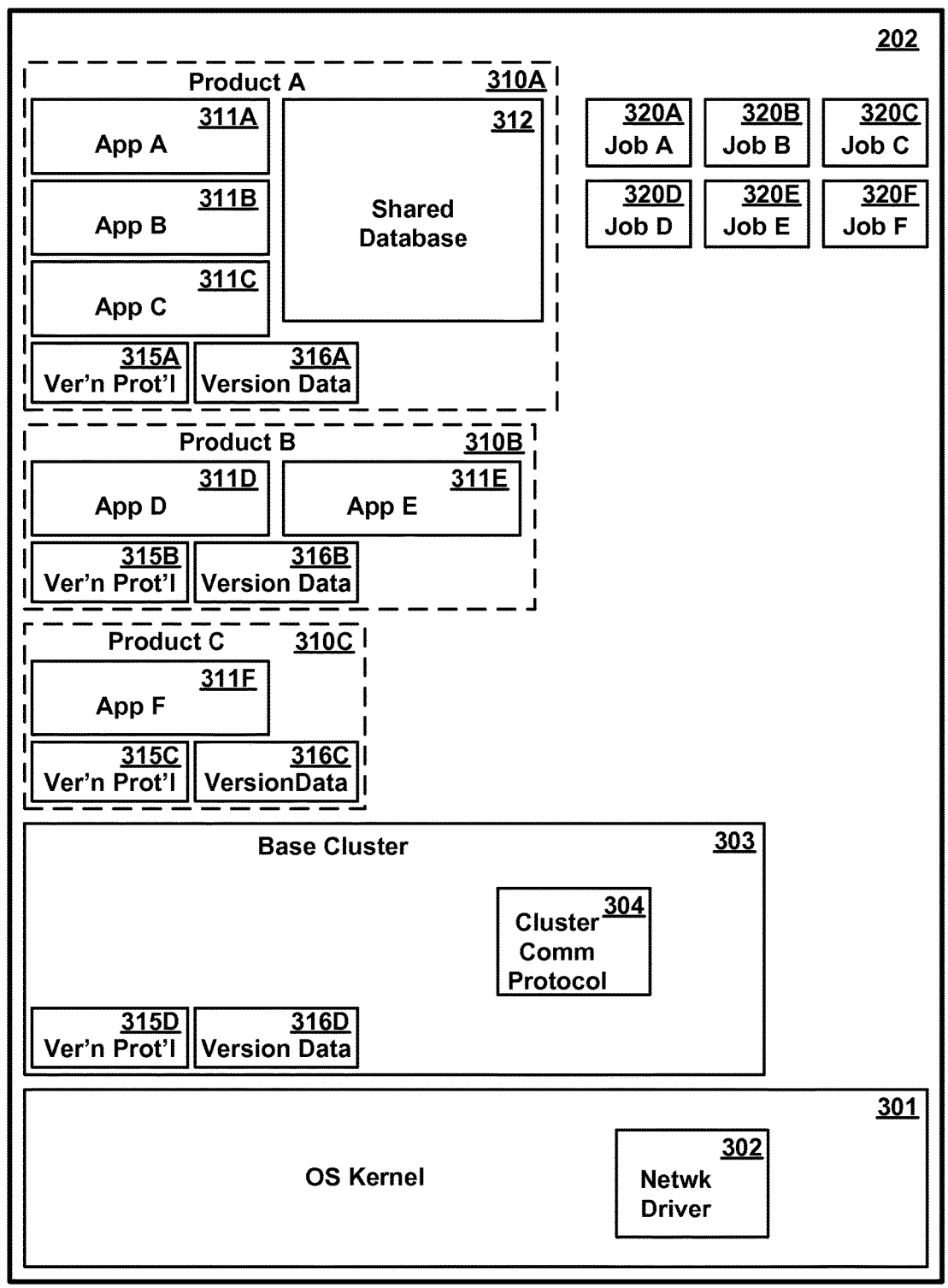
FIG. 3 is a conceptual illustration of the major software components of a computer system of FIG. 2 configured as a cluster node, according to one or more embodiments.

FIG. 3 is a conceptual illustration of the major software components of computer system 200 in memory 202, configured to provide the function of a node 102 which performs part of the workload of cluster 101, according to one or more embodiments. In one or more embodiments, the software components illustrated in FIG. 3 occupy a single logical partition (virtual machine) of a physical computer system 200 supporting multiple logical partitions; however, the illustrated components of a hardware management console could alternatively reside in an unpartitioned, dedicated physical machine. Operating system kernel 301 is code executable on processor 201 and state data which together provide various low-level software functions, such as device interfaces, management of memory pages, management and dispatching of multiple tasks, etc. as is well-known in the art. In particular, OS kernel 301 includes one or more network adapter drivers 302 for handling communications with network 103 via network adapters 214.

System memory 202 further includes cluster infrastructure software referred to as the base cluster 303. Base cluster is code executable on processor 101 and state data, above the level of OS kernel 301, which enable computer system 200 to act as a node in cluster 101. Base cluster 303 contains multiple functions for receiving incoming requests from clients 105, initiating software processes necessary to respond to the client requests, transmitting responses to clients, and handling communications with other nodes in the cluster, and so forth. In particular, base cluster 303 includes an inter-node cluster communications protocol function 304 for sending and receiving cluster communications protocol messages to and from other nodes of the cluster. Such cluster communications protocol messages include version protocol messages for updating software product version state, as explained in greater detail herein.

System memory 202 further contains one or more software products 310A-C (herein generically referred to as feature 310), of which three are illustrated in FIG. 3, it being understood that the number may vary. Each product includes one or more software applications 311A-F (herein generically referred to as feature 311), comprising respective code executable on processor 201, of which six are illustrated in FIG. 3, it being understood that the number may vary. A product may contain a shared database 312 for use by multiple applications, as well as other data structures (not shown). A software product may contain an arbitrary number of modules of code and/or data, but all modules of a software product have a common version and are generally supplied by the same source, e.g. vendor In operation, base cluster 303 processes received requests from clients 105. Depending on the cluster configuration, a request may be transferred to another node 102 for servicing. If the request is to be serviced in the node in which base cluster 303 executes, is initiates one or more jobs to process the request. Essential state data for each job is held in memory as job state data, illustrated in FIG. 3 as job state data 320A-F (herein generically referred to as feature 320). While six job state data modules are shown in FIG. 3 for illustrative purposes, it will be understood that the number of jobs active may vary, and is often much greater than six. A job instantiates at least one application 311, it being possible that multiple jobs instantiating the same application will exist in a node at the same time, each having its own job state data 320. A job may be an isolated process which is executed only on a single computer system (i.e. node), or it may be part of a cooperative process of multiple jobs on different respective nodes in the cluster which pass messages among themselves. Base cluster handles message passing among the different nodes and returns any required response to the client as the corresponding job or jobs complete execution.

In accordance with one or more embodiments herein, each software product 310, as well as base cluster 303, further contains or is otherwise associated with a respective version protocol function 315A-D (herein generically referred to as feature 315) and a version data record 316A-D (herein generically referred to as feature 316). Although base cluster is illustrated in FIG. 3 separately from "software products", it is in fact itself a software product for purposes of version management. Version protocol function 315 is executable code which exchanges version protocol messages and handles version state maintenance for the corresponding software product or base cluster using data in the corresponding version data record 316, as explained more fully herein. FIG. 3 illustrates the version protocol function 315 and version data records 316 being contained in their respective base cluster or other software products for clarity of illustration, it being understood that the version protocol functions may be linked to or otherwise associated with the base cluster or other software products by other means, and that version protocol functions may originate from a different source than other modules of the software product.

Figure 4:
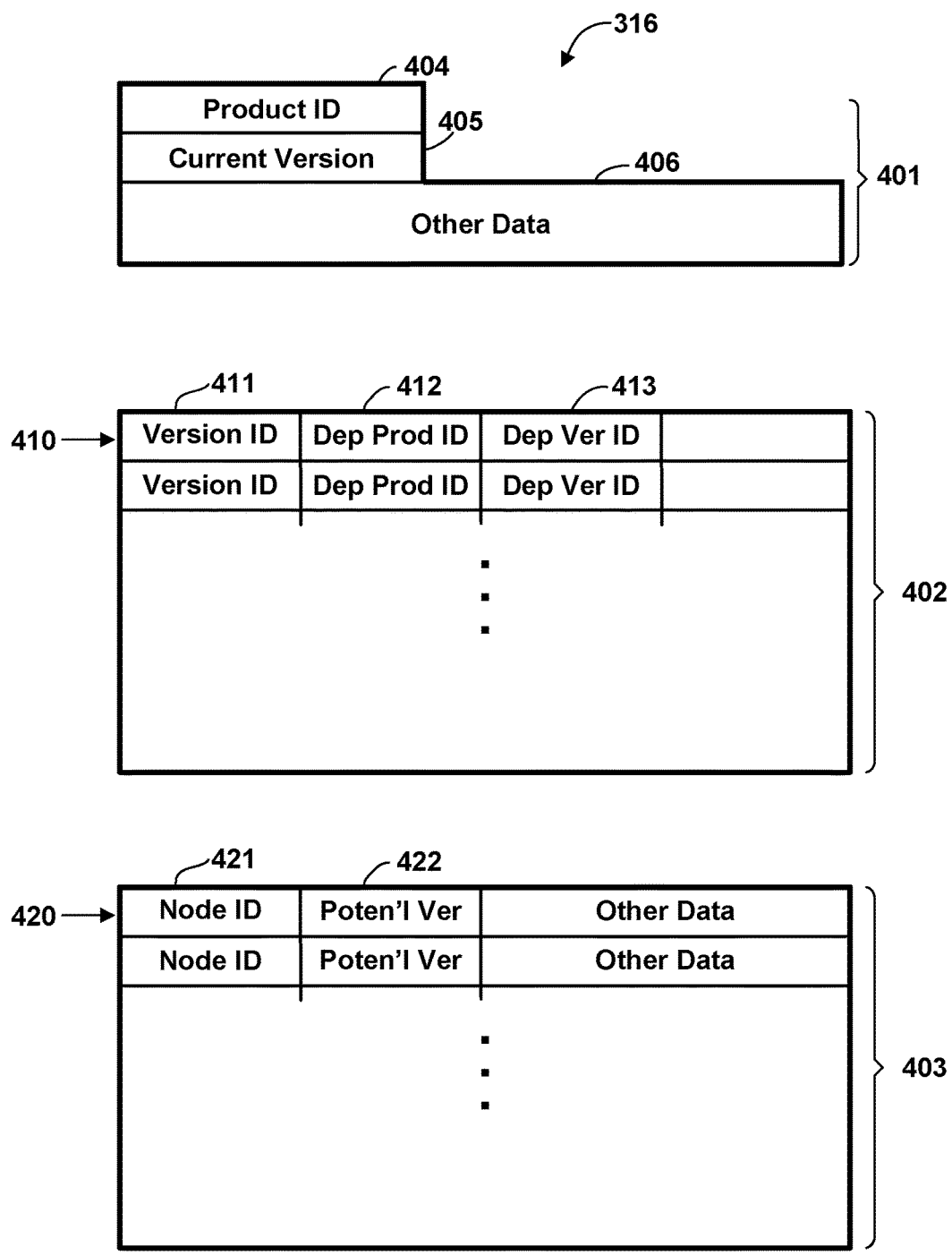
FIG. 4 is a conceptual representation of the structure of a version data record used by a version protocol function for handling version updates to the base cluster or other software products, according to one or more embodiments.

FIG. 4 is a conceptual representation of the structure of a version data record 316 used by a version protocol function 315 for handling version updates to base cluster or other software products, according to one or more embodiments. Referring to FIG. 4, version data record 316 comprises a header portion 401, a product dependencies table portion 402, and a product group table portion 403.

Header 401 includes a product ID field 404, a current version field 405, and may optionally contain other data 406 useful in managing versions and updated to the software product. Product ID 404 contains an identifier of the product to which the version data record pertains. Current version 405 contains a designator of the current version level of the applicable software product supported by the group of nodes defined in node group portion 403. In the embodiments described herein, a group of nodes executing a common software product supports a single common version level of that product. This version level is generally the highest version level supported by all nodes in the group. It is possible to install a higher version level on one or more individual nodes of the group, but for consistency every node must execute the lower version level supported by the group as a whole. Therefore, there is only one "current version" applicable to the group, which is the value stored in current version field 405.

Product dependencies table 402 stores any dependencies of various versions of the applicable software product on other software products. Product dependencies table 402 is conceptually a table having a variable number of entries 410, each entry containing a version identifier 411, a dependency product identifier 412, and a dependency product version identifier 413, and may further include additional data. Each entry 410 corresponds to a dependency of a specific version (identified in version identifier field 411) of the applicable software product (i.e., identified in the header's product ID field 404) upon a specific version (identified in the dependency product version identifier field 413) of another product (identified in the dependency product identifier field 412). For example, a value of "Product A" in field 404, "Version 3.2" in field 411, "Product B" in field 412, and "Version 2.1" in field 413 means that version 3.2 of Product A is dependent on version 2.1 of Product B, and can not be executed until version 2.1 (or higher) of Product B is first installed and running on the system as the "current version" of Product B. A dependency product identifier 412 and corresponding dependency product version identifier 413 could include the operating system and a specific version of the operating system, respectively, if the applicable software product is dependent on that specific version of the operating system. Because a separate entry 410 exists for each version and dependency software product, dependency relationships of each version of the applicable software product can be independently specified.

Product group table 403 identifies the nodes of the group associated with the applicable software product and the version level supported by those nodes. Product group table 403 is conceptually a table having a variable number of entries 420, each entry containing a node identifier 421 and a potential version 422, and may optionally contain additional data. Node identifier 421 identifies a node of the group, and potential version 422 identifies the highest version level of the applicable software product which can currently be supported by the corresponding node. The potential version is not necessarily the same as the current version 405 of the applicable software product which is supported by the group. As explained, this current version is generally the highest version which all nodes of the group support. An individual node of the group may have installed a higher version of the software product, and may have installed all other software products/versions upon which that higher version is dependent. In such a case, the higher version is its "potential" version, since it can support execution of the higher version but is constrained to execute a lower version common to all nodes of the group.

Although tables 402, 403 are described herein as tables and are data structures which are logically equivalent to tables, they may be arranged in any suitable structure known in the art, and may include one or more auxiliary data structures, also sometimes referred to as metadata (not shown), such as indexes and so forth.

Various software entities are represented in FIGS. 3 and 4 as being separate entities or contained within other entities. However, it will be understood that this representation is for illustrative purposes only, and that particular modules or data entities could be separate entities, or part of a common module or package of modules. Furthermore, although a certain number and type of software entities are shown in the conceptual representations of FIGS. 3 and 4, it will be understood that the actual number of such entities may vary, and in particular, that in a complex cluster computing environment, the number and complexity of such entities is typically much larger.

While the software components of FIGS. 3 and 4 are shown conceptually as residing in memory 202, it will be understood that in general the memory of a computer system will be too small to hold all programs and data simultaneously, and that information is typically stored in data storage devices 225-227, comprising one or more mass storage devices such as rotating magnetic disk drives, and that the information is paged into memory by the operating system kernel 301 as required. Furthermore, it will be understood that the conceptual representation of FIG. 3 is not meant to imply any particular memory organizational model, and that system 200 might employ a single address space virtual memory, or might employ multiple virtual address spaces which overlap.

Version Upgrade Process

In one or more embodiments, state data in version data record 316 and the current versions of various software products executing on multiple nodes is maintained by various peer-to-peer version protocol functions and base cluster software which pass version protocol messages among software products and modules of the cluster. In general, each product independently maintains its own version and determines upgrade conditions using its own upgrade rules, without reference to rules governing the upgrade of other products. In other words, upgrade of a Product A may be dependent on a particular version of a Product B being present, but Product A's version functions are not aware of and do not access the rules governing version upgrades for Product B. A triggering event, such as an installation of a local product version upgrade or a message received from another node or product, triggers a re-evaluation of whether a product version supported by the multiple nodes can be upgraded. If conditions are met for upgrade of a product, upgrade is performed on the nodes of the group in which the product is installed, and in each such node, a version protocol message is sent to all other products notifying them of the upgrade. Each of the other products then determines whether it can be upgraded as a result of the recent upgrade to the first product, and if so, another set of version protocol messages is sent. This cycle continues until all dependent products have been updated.

Figure 5:
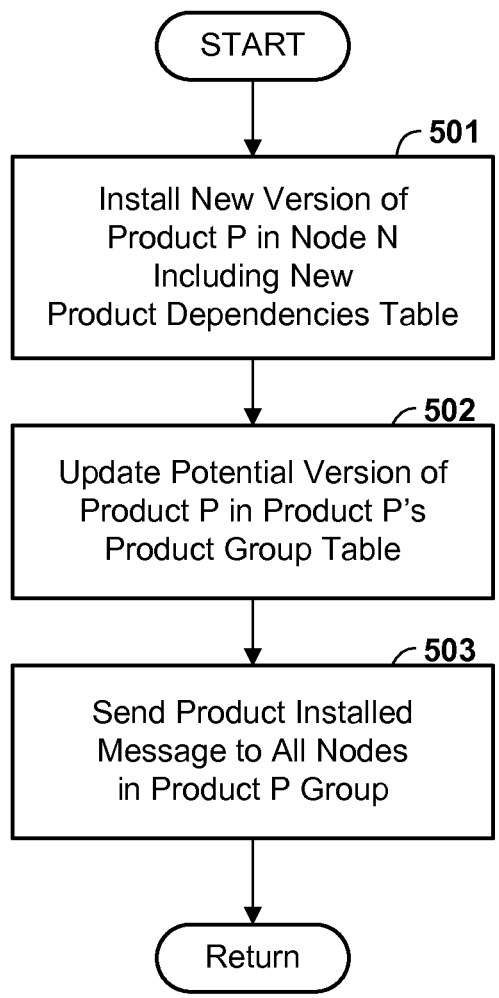
FIG. 5 is a flow diagram illustrating at a high level the process of updating product version state responsive to installing a new version of a product in a node of a cluster, according to one or more embodiments.
Figure 6:
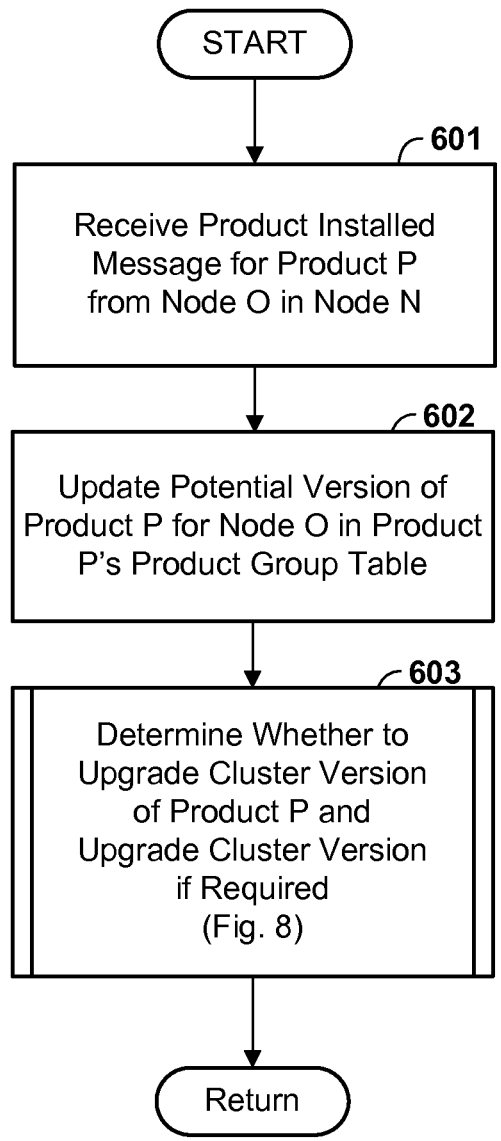
FIG. 6 is a flow diagram illustrating at a high level the process of responding to a Product Installed message received from another node, according to one or more embodiments.
Figure 7:
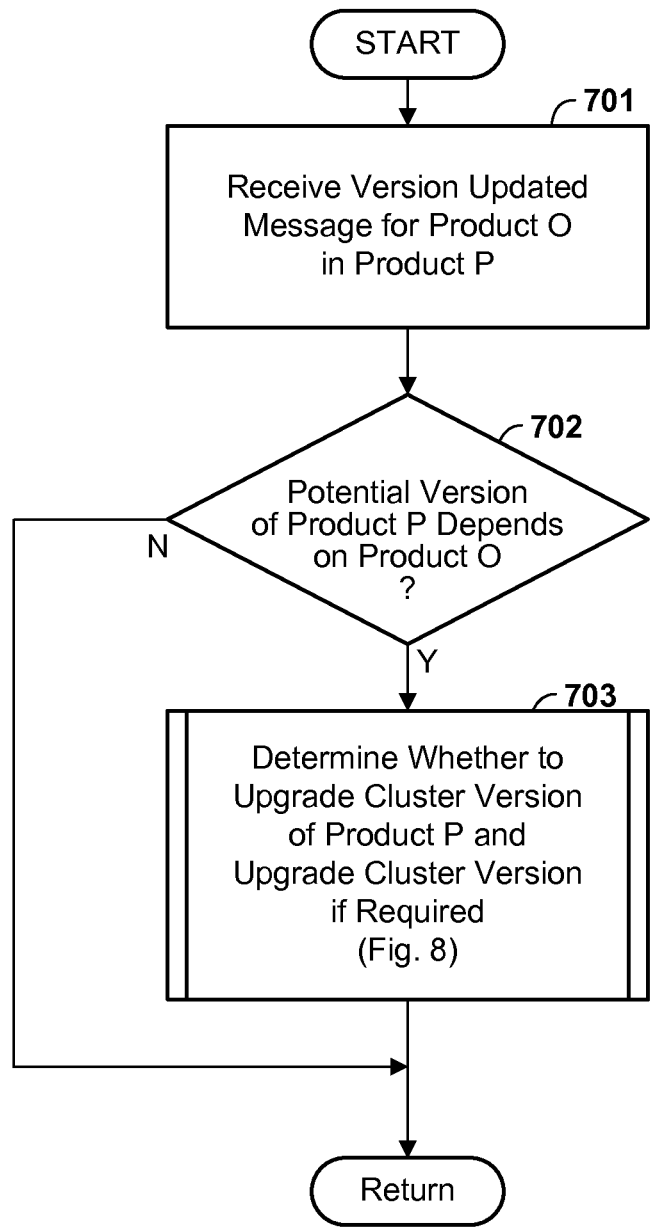
FIG. 7 is a flow diagram illustrating at a high level the process of responding to a Version Updated message, according to one or more embodiments.

Three possible triggering events are depicted in FIGS. 5-7, respectively. These include (a) installation of a new version of a software Product P in the local node, shown in FIG. 5; (b) receipt of a message that a new version of a software Product P was installed in a node, shown in FIG. 6; and (c) receipt of a message that another Product O has upgraded its current version, shown in FIG. 7.

FIG. 5 is a flow diagram illustrating at a high level a process of updating product version state, including version data record 316, responsive to installing a new version of a product 310 in a node 102 of a cluster 101, according to one or more embodiments. That is, FIG. 5 illustrates a version state updating process which is triggered by installation of a new version VN of a Product P in a particular Node N.

Referring to FIG. 5, a new version VN of Product P is installed in Node N (block 501). This new version will include a new product dependencies table 402 which includes any dependencies of the new version of Product P on other software products, if such dependencies exist. Installation of the new version of Product P can be performed using any conventional means, e.g., manual installation from physical media such as DVD, CD-ROM, or tape, or download of the new version from a server via network 103 (which may be manually initiated or performed automatically according to how the node configuration and other factors). Although the new version is installed, it does not immediately begin execution and does not immediately replace the previous version (VO) of Product P.

Upon successful completion of installation of version VN of Product P, the potential version field 422 for Node N in product group table 403 of Product P is updated to version VN (block 502). The action depicted by block 502 occurs only in the local node, i.e. Node N. This same data must be replicated in all other nodes of the group. Version protocol function 315 for Product P in Node N therefore generates a Product Installed message, and sends this message to all nodes of the group using inter-node cluster communications function 304 (block 503), i.e., the message is sent to all nodes listed in the product group table 403 of Product P. A separate respective function executing in each of the Product P group nodes is triggered on receipt of the Product Installed message and will update the corresponding product group table in the receiving node, as well as take other appropriate action, as explained further herein. In accordance with the protocol convention, the Product Installed message is sent to Node N itself as well as nodes in the group other than Node N to trigger the responsive function.

FIG. 6 is a flow diagram illustrating at a high level the process of responding to a Product Installed message received from a sending node, according to one or more embodiments. That is, FIG. 6 illustrates a version state updating process which occurs in Node N, triggered by receipt of a Product Installed message which was generated in a Node O (which could be the same node as N) at block 503 of FIG. 5.

Referring to FIG. 6, a Product Installed message for a particular Product P is received in the inter-nodal cluster communications protocol function 304 for Node N, the Product Installed message having originated in a sending Node O (block 601). Note that the Product Installed message could pertain to the base cluster itself, i.e., Product P could be the base cluster itself, in which case version state update is handled by the corresponding version protocol function 315D in base cluster 303.

The version protocol function 315 for Product P updates its product group table 403 by updating the potential version field 422 for Node O in the table with the version identifier of the version which was recently installed in Node O (block 602). This information is carried in the Product Installed message. In the case where Node N is the same as Node O, this step is skipped since the product table has already been updated.

The version protocol function 315 for Product P in Node N then makes a determination whether to initiate upgrade of the current version of Product P in use by the node group of the cluster, and if so, initiates upgrade of the current version of Product P. These actions are depicted in FIG. 6 as block 603, and are shown in greater detail in FIG. 8 and described in the accompanying text herein.

FIG. 7 is a flow diagram illustrating at a high level the process of responding to a Version Updated message, according to one or more embodiments. A Version Updated message is broadcast from the version protocol function 315 of a product, upon the product's current version being updated, to all other products in the same local node, because such an update may make other products, which are dependent on the updated product, eligible for upgrade. The Version Updated message could pertain to an upgrade of the Base cluster itself. The Version Updated message is generated at block 813 of FIG. 8.

Referring to FIG. 7, a Version Updated message reporting that Product O's current version has been upgraded is received in the version protocol function 315 for Product P (block 701). This is a local message which is sent from one software component of a node to another software component in the same node.

The version protocol function 315 for Product P determines whether the potential version of Product P depends on Product O (block 702). The potential version in this case is the potential version of Product P for the local node as shown in the corresponding entry of product group table 403. Version protocol function references Product P's product dependencies table 402 to determine whether any matching entry is found, i.e., an entry having a version ID 411 equal to the potential version and a dependency product ID 412 equal to Product O. If no match is found, then Product P is not dependent on Product O, and the recent upgrade to Product O can have no effect on Product P's upgrade eligibility. Accordingly, the 'N' branch is taken from block 702, and no further processing of the Version Updated message is performed by the version protocol function for Product P. If a match is found, the 'Y' branch is taken to block 703, to initiate a determination of eligibility to upgrade.

If the branch is taken to block 703, the version protocol function 315 for Product P in Node N then makes a determination whether to initiate upgrade of the current version of Product P in use by the node group of the cluster, and if so, initiates upgrade of the current version of Product P. These actions are depicted in FIG. 7 as block 703, and are shown in greater detail in FIG. 8 and described in the accompanying text herein.

Figure 8A:
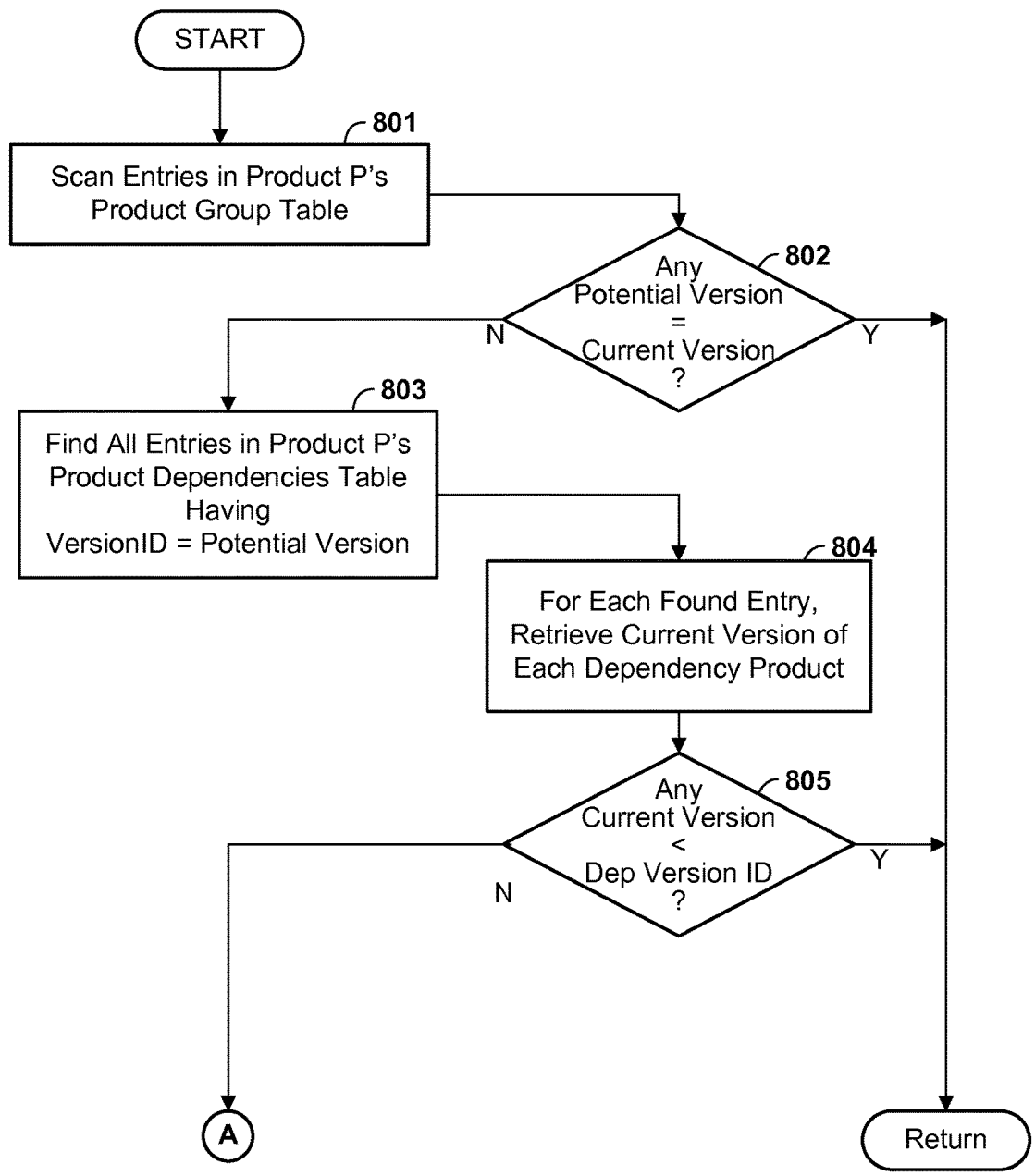
FIGS. 8A and 8B (herein collectively referred to as FIG. 8) are a flow diagram illustrating at a high level the process of determining whether to upgrade a cluster version of a product and upgrading the cluster version, according to one or more embodiments.
Figure 8B:
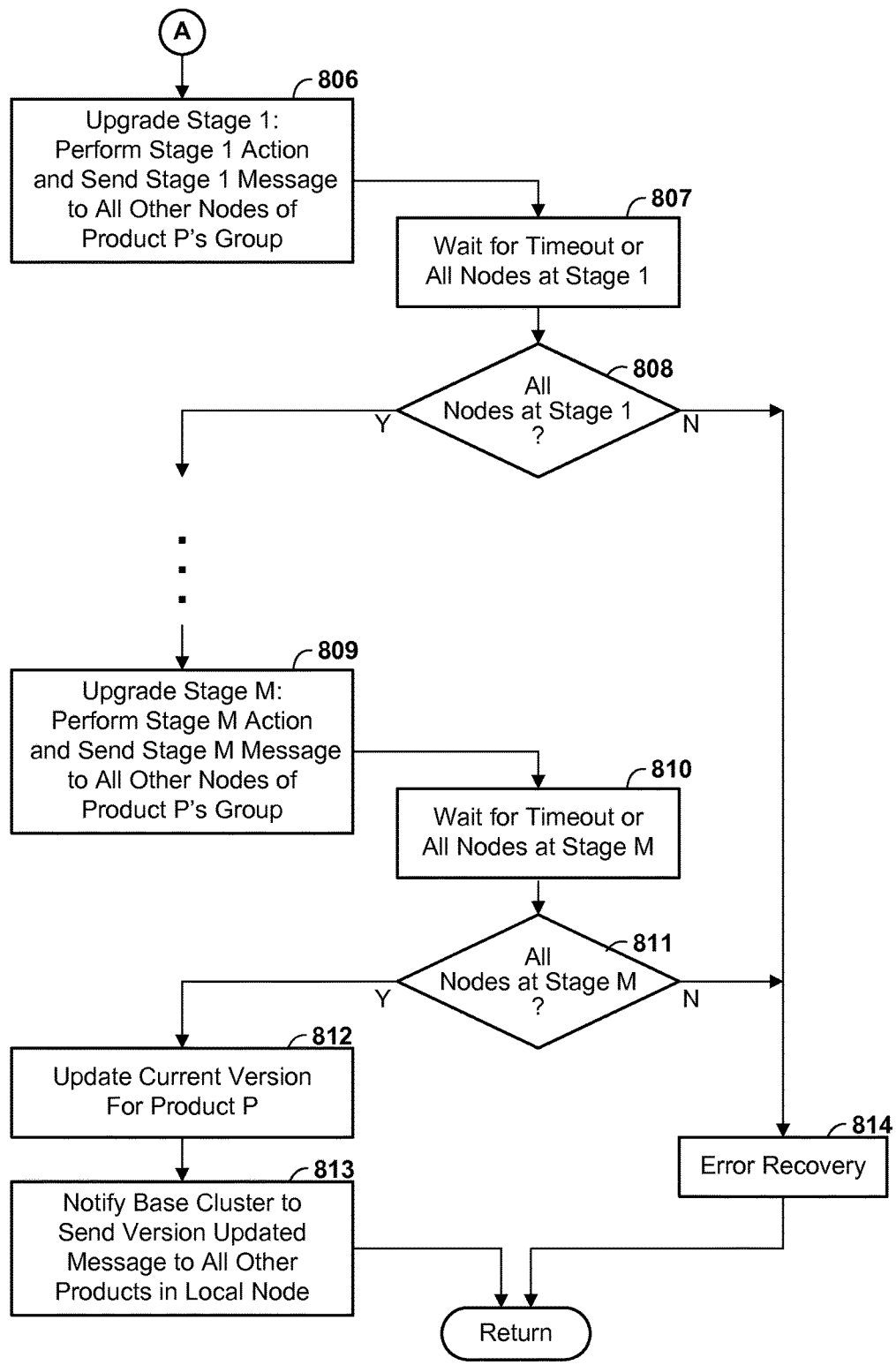

FIGS. 8A and 8B (herein collectively referred to as FIG. 8) are a flow diagram illustrating at a high level the process performed by a version protocol function 315 for Product P of determining whether to initiate upgrade a cluster version of Product P and upgrading the cluster version based the determination, according to one or more embodiments.

Referring to FIG. 8, upon triggering an upgrade determination by any of various means illustrated in FIGS. 5-7 and explained previously, the version protocol function for Product P scans the entries in Product P's product group table 403 to determine whether nodes have new version installed (block 801). The potential version field 422 in the table indicates, with respect to each node of the group, the highest version level of Product P which is installed (although not necessarily enabled to execute) in each respective node. If all nodes have a version installed which is higher than the current version, then the current version of Product P could possibly be upgraded. If the highest installed version of at least one node is the current version, then it is not possible to upgrade from the current version. This test is performed at block 802 by comparing the potential version field 422 value with the current version of Product P from field 405. If any node has the potential version equal to the current version, the 'Y' branch is taken from block 802, and the process returns since it is not possible to upgrade in this circumstance. If none of the potential versions are equal to the current version (all above the current version), then the 'N' branch is taken to block 803. In this case, upgrade may be possible, but additional data must be examined to complete the determination.

The version protocol function examines the product dependencies table 402 for Product P, to find all entries 410 having a version ID value 411 equal to the potential version of the upgrade (block 803). For simplicity of explanation, it may be assumed that this is one version above the current version, although in some environments in may be possible to skip over a version, provided that all nodes are at that potential. For each such entry found in table 402, the current version of the dependency product is retrieved (block 804). The dependency product (Product D) is identified in dependency product ID field 412 of the corresponding table entry. Since this is necessarily a product other than Product P, Product P's version data 316 would not include the current version of Product D. The current version of Product D will be recorded in current version 405 of Product D's version data 316. In one or more embodiments, at block 804, Product P sends a message to Product D requesting the current version of Product D, and receives the current version in response. It would alternatively be possible to provide this data in some other manner. The current version of each Product D identified in a dependency product ID field 412 from a product dependencies table record is compared to the dependent version ID field 413 of the same record (block 805). Dependent version ID field 413 contains the minimum version of Product D required to support the new version of Product P. If any current version retrieved at block 804 is less than the corresponding dependent version ID from field 413, then the minimum requirements for supporting the new version of Product P are not met, the 'Y' branch is taken from block 805, and the process returns since it is not possible to upgrade Product P. If all current versions meet or exceed the minimum required version specified in field 413, then the 'N' branch is taken from 805 to block 806. In this case, Node N satisfies the requirements for upgrading Product P to a new version.

The process depicted in FIG. 8 is executed in each node of Product P's group concurrently. If all nodes in Product P's group are eligible to upgrade (i.e., in each node, the 'N' branch is taken from block 805), then Product P can be upgraded. Upgrade to Product P's new version is then performed in stages. At each Stage i, some action corresponding to Stage i is performed in the local node and a Stage i status message is sent to the other nodes of the group (shown as blocks 806 and 809). Product P's version protocol function 315 in Node N waits for a timeout or Stage i status message from all nodes of the group (blocks 807 and 810). If all nodes send the Stage i status message, the 'Y' branch is taken from blocks 808, 811, and the version protocol function advances to the next stage. If, at any stage, not all the nodes are successful, timeout will be reached and the 'N' branch will be taken, e.g., from blocks 808 or 811, to error recovery (block 814). By these means, the actions performed in different nodes can be synchronized as needed. The number of stages and actions performed at each stage may vary with many factors in the cluster environment. In a simple embodiment, the old version of Product P is stopped in all nodes by allowing all existing jobs which execute Product P to complete while any incoming jobs are enqueued, and after all existing jobs have completed, the enqueued jobs are started using the new version of Product P. However, in some embodiments startup of the new version may be staggered in different nodes.

When the final stage of upgrading Product P is successfully complete (the 'Y' branch from block 811), the current version field 405 in version record 316 is updated to the new version of Product P (block 812). A Version Updated message is then sent to all other products in the same local node (block 813). This Version Updated message will trigger other products to determine whether they in turn need to be updated, as illustrated in FIG. 7 and described above in the accompanying text. The upgrade process in Product P then returns.

The above described processes may result in a cascading of upgrades when suitable conditions are met. For example, assuming that a product P1 depends on the base cluster version, and a product P2 depends on a version of product P1, and that the new versions of the product P1 and product P2 are installed in all nodes of their respective groups before completing installation of the base cluster in all nodes. The follow sequence of events may occur:

Time t0: The base cluster determines that its version can be updated, and the version is updated (e.g., triggered by installation of the base cluster in one of the nodes, as shown in FIG. 5).

Time t1: A Version Updated message is sent by each base cluster to both the P1 product and P2 product, if present in the applicable node, notifying these products of the update of the base cluster (block 813).

Time t2: Each product P1 and P2 concurrently processes the Version Updated message (FIG. 7). The P2 products determine that version dependencies are not met and take no action. The P1 products determine that P1 can upgrade its version and initiate upgrade.

Time t3: Product P1 completes upgrade and issues a Version Updated message to product P2 (block 813).

Time t4: Each product P2 processes the Version Updated message. Since P1 has now been upgraded, the P2 products determine that version dependencies are met, and initiate upgrade.

Time t5: Product P2 completes upgrade and issues a Version Updated message to Product P1 (block 813).

Time t6: Product P1 receives the Version Updated message but takes no action since P1 is not dependent on P2 (FIG. 7, block 702).

It will be observed that, in accordance with the processes described above, products are upgraded in the correct sequence regardless of the sequence in which they are actually installed in the respective nodes. In the above example, the base cluster is installed after products P1 and P2, yet they upgrade in the correct order. Had the base cluster been installed in all nodes first, the base cluster would have been upgraded, and upgrade of product P1 would have been triggered later upon installation of product P1 in all the nodes.

Other Embodiments and Variations

In various embodiments described above, the multiple computer systems or "nodes" form a "cluster" which provides computing services to multiple clients. However, management of version upgrades in accordance with the present invention is not necessarily limited to a cluster environment, and could be applicable to other multi-system environments. For example, methods or apparatus as described herein could be used for managing version upgrade in a cloud or a subset of computer systems which are used to support a cloud computing environment.

In the embodiments described above, the conditions upon upgrade of a software product are that the new version of the product is installed on all nodes of a group, and that all products upon which the software product is dependent have been upgraded to the required version level of the corresponding product. However, it will be understood that other and/or additional conditions could be placed on upgrade of a software product, and that these conditions could be different for each software product. For example, instead of requiring that the new version of the product be installed on all nodes of the group, upgrade could be conditioned on installation in some proportion of the nodes in the group less than 100%. In such a case, nodes having the older version of the software product could be dropped from the group upon upgrade, and rejoined to the group later as the software product is updated in those nodes. Additional conditions could include, for example, time of day, day of week, or system usage, whereby upgrade might be deferred if the time is not optimal or the system is overly busy.

Although version protocol functions 315 and version data records 316 are illustrated in FIG. 3 and described herein as separate from one another and associated with each respective product, it will be understood that the actual location of the code for performing these functions and associated data structures is a matter of design choice, and could be anywhere in the system. In particular, version protocol function code could be a single entity having common code for all the products, which is separately instantiated for each of the products and accesses separate data 316 for each of the products. Such a single entity could be contained, e.g., within base cluster 303.

In the embodiments described above, eligibility to upgrade determinations are made by peer-to-peer version protocol functions which are distributed among the multiple nodes of the cluster. However, it will be understood that in one or more alternative embodiments, such determinations could be made in whole or in part by other functions. For example, data could be collected in a central determination function from a plurality of agents distributed among the multiple nodes, and the determinations made by the central determination function.

Although a series of steps has been described above as one or more preferred and/or alternative embodiments, it will be appreciated that many variations of processes for managing version upgrading in a multiple system environment are possible. In particular, some steps may be performed in a different order, different data structures may be used, and/or different hardware or software resources may be employed to perform functions described herein.

In general, the routines executed to implement the illustrated embodiments of the invention, whether implemented as part of an operating system or a specific application, program, object, module or sequence of instructions, including a module within a special device such as a service processor, are referred to herein as "programs" or "control programs". The programs typically comprise instructions which, when read and executed by one or more processors in the devices or systems in a computer system consistent with the invention, cause those devices or systems to perform the steps necessary to execute steps or generate elements embodying the various aspects of the present invention. Moreover, while the invention has and hereinafter will be described in the context of fully functioning computer systems, the various embodiments of the invention are capable of being distributed as a program product embodied in non-transitory computer-readable media, and the invention applies equally regardless of the form of distribution. Examples of non-transitory computer-readable media include, but are not limited to, volatile and non-volatile memory devices, floppy disks, hard-disk drives, CD-ROM's, DVD's, and magnetic tape, it being understood that these examples are not exhaustive. Examples of non-transitory computer-readable media are illustrated in FIG. 2 as system memory 202 and data storage devices 225-227.

Unless inconsistent with the invention or otherwise qualified herein, computer program code for carrying out operations for aspects of the present invention may be written in any combination of one or more programming languages, including an object oriented programming language such as JAVA, Smalltalk, C++ or the like and conventional procedural programming languages, such as the "C" programming language or similar programming languages. The program code may execute as a stand-alone software package or in conjunction with other program code, and may execute entirely on a single machine or on multiple computers connected in a distributed fashion. Multiple computers may be connected to one another through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the non-transitory computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although a specific embodiment of the invention has been disclosed along with certain alternatives, it will be recognized by those skilled in the art that additional variations in form and detail may be made within the scope of the following claims:

What is claimed is:

1. A computer program product for managing versions of a plurality of software products executing on a set of multiple digital data computing devices, the computer program product comprising computer-executable instructions recorded on non-transitory computer-readable media, wherein the instructions, when executed, cause at least one computer system to perform:
   (a) for each software product of said plurality of software products, detecting a respective trigger condition;
   (b) for each software product of said plurality of software products, responsive to the respective trigger condition, independently determining whether a currently executing version of the respective software product can be upgraded to a newer version of the respective software product, wherein said independently determining is performed without determining whether a currently executing version of any software product other than the respective software product can be upgraded;
   (c) responsive to independently determining, in said (b), that an eligible software product of said plurality of software products can be upgraded, upgrading the eligible software product;
   (d) responsive to the upgrading the eligible software product, generating a respective first trigger condition for each of one or more software products of said plurality of software products other than said eligible software product, the respective first trigger condition triggering said independently determining whether a currently executing version of the respective software product can be upgraded to a newer version of the respective software product; and
   (e) iteratively repeating said (b), (c) and (d), by repeating (b) and (c) for each of the one or more software products of said plurality of software products other than said eligible software product for which the respective trigger condition was the respective first generated trigger condition in the previous iteration of (d), and repeating (d) if an eligible software product was upgraded in (c), until said independently determining whether a currently executing version of the respective software product can be upgraded into a newer version of the respective software product determines, with respect to each software product for which a first trigger was generated, that it cannot be upgraded.

2. The computer program product of claim 1, wherein said set of multiple digital data computing devices is a cluster of digital data computing devices.

3. The computer program product of claim 1, wherein said computer program product comprises one of a plurality of peer-to-peer functions, each for location in a respective digital data computing device of said set of digital data computing devices, and wherein said independently determining whether a currently executing version of the respective software product can be upgraded to a newer version of the respective software product comprises:
   determining, in the peer-to-peer functions, whether the respective digital data computing device is eligible to execute the newer version of the respective software product; and
   communicating a result of determining whether the respective digital data computing device is eligible to execute the newer version of the respective software product to each of the peer-to-peer functions located in digital data computing devices of said set of digital data computing devices other than the respective digital data computing device.

4. The computer program product of claim 3, wherein said independently determining whether a currently executing version of the respective software product can be upgraded to a newer version of the respective software product determines that the currently executing version of the respective software product can be upgraded to a newer version only if each of said plurality of peer-to-peer functions determines that the respective digital data computing device in which the respective peer-to-peer function is located is eligible to execute the newer version of the respective software product.

5. The computer program product of claim 1, wherein said independently determining whether a currently executing version of the respective software product can be upgraded to a newer version of the respective software product comprises:
   determining whether the newer version of the respective software product is installed in each digital data computing device on which the respective software product executes; and
   determining whether the currently executing version of each software product upon which the respective software product is dependent is sufficient to support the newer version of the respective software product.

6. The computer program product of claim 1, wherein each software product of said plurality of software products is installed in a respective subset of digital data computing devices contained in said set of multiple digital data computing devices, wherein for at least one software product of said plurality of software products, the respective subset contains at least one and fewer than all digital data computing devices in said set of multiple digital data computing devices.

7. The computer program product of claim 2, wherein said plurality of software products includes a base cluster software product for enabling each digital data computing device in which the base cluster software product is installed to function as a node of said cluster.

8. A digital data computing device, comprising:
   a memory;
   at least one processor communicatively coupled to said memory and executing code instructions storable in said memory;
   a plurality of software products embodied as code storable in said memory and executable on said at least one processor, each product being executable on multiple digital data computing devices of a set of digital data computing devices, said set supporting execution of a respective current version of each of said plurality of software products;
   wherein a respective product upgrade protocol is associated with each of said plurality of software products, each product upgrade protocol supporting upgrade of the corresponding current version of the corresponding software product for which said set of digital data computing devices supports execution, each product upgrade protocol updating the current version of its corresponding software product by detecting a trigger condition, and thereafter iteratively (a) determining, responsive to the respective trigger condition, whether the current version of the corresponding software product can be upgraded to a newer version based on respective one or more upgrade rules associated with the corresponding software product, without reference to rules governing the upgrade of other software products, (b) responsive to determining that a current version of the corresponding software product can be upgraded to a newer version, causing the current version of the corresponding software product to be upgraded to the newer version thereof, (c) responsive to the upgrading the current version of the corresponding software product to the newer version thereof, generating a respective first trigger condition for each software product of said plurality of software products other than the corresponding software product, the respective first trigger condition triggering said (a) in the upgrade protocol associated with each software product of said plurality of software products other than the corresponding software product, and (d) repeating (a), (b) and (c) until each product upgrade protocol of the respective product upgrade protocols associated with each of said plurality of software products determines in (a) for which the respective trigger condition was the respective first generated trigger condition that the current version of the corresponding software product cannot be upgraded to a new version;
   wherein upgrade of a first software product of said plurality of software products from a first version to a second version is dependent on the current version of a second software product of said plurality of software products being at least a pre-requisite version level specified by the one or more upgrade rules associated with the first software product; and
   wherein upgrade of said second software product from a level below said pre-requisite version level to said pre-requisite version level is a triggering event for determining whether the current version of the first software product can be upgraded.

9. The digital data computing device of claim 8, wherein said plurality of software products includes a base cluster enabling said digital data computing device to function as one of a plurality of nodes in a cluster which supports execution of each of said plurality of software products on respective multiple nodes of said cluster.

10. The digital data computing device of claim 8, wherein each product upgrade protocol operates in a peer-to-peer relationship with other product upgrade protocols in other nodes of said set of digital data computing devices.

11. The digital data computing device of claim 8, wherein said determining whether the current version of the corresponding software product can be upgraded to a newer version based on respective one or more upgrade rules associated with the corresponding software product comprises:
   determining whether the newer version of the respective software product is installed in each device of said set of digital data computing devices on which the respective software product executes; and
   determining whether the current version of each software product upon which the respective software product is dependent is sufficient to support the newer version of the respective software product.

12. The digital data computing device of claim 8, wherein each software product of said plurality of software products is installed in a respective subset of devices of said set of digital data computing devices, wherein for at least one software product of said plurality of software products, the respective subset contains at least one and fewer than all devices in said set.

* * * * *